Figure 1:
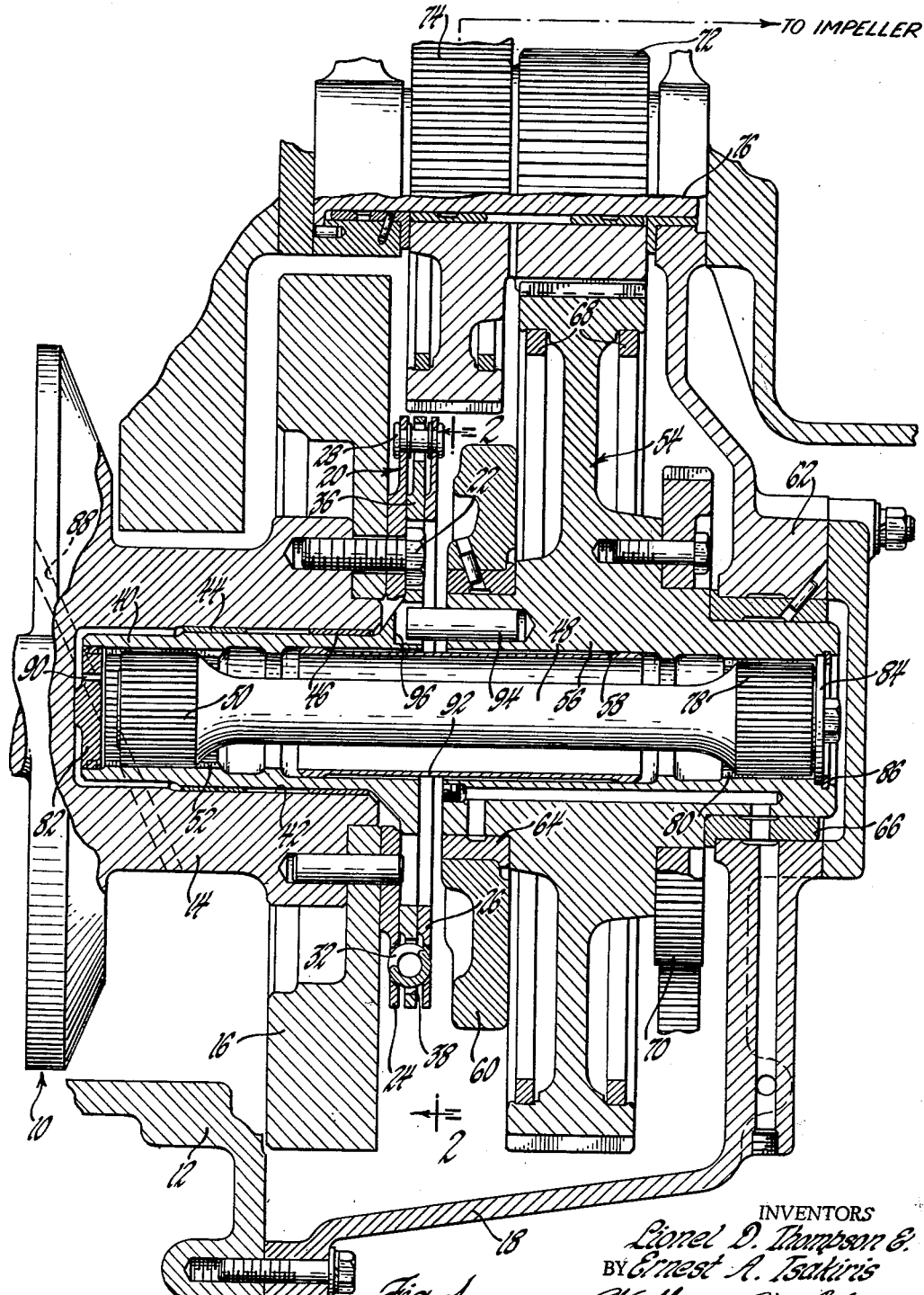

Dec. 8, 1964   L. D. THOMPSON ETAL   3,159,987
TORSIONALLY RESILIENT DRIVE CONNECTION
Filed July 10, 1962   2 Sheets-Sheet 2

INVENTORS
Lionel D. Thompson &
BY Ernest R. Tsakiris
William V. Ebs
ATTORNEY

United States Patent Office 3,159,987
Patented Dec. 8, 1964

3,159,987
TORSIONALLY RESILIENT DRIVE CONNECTION
Lionel D. Thompson, Wyckoff, and Ernest A. Tsakiris, Hackensack, N.J., assignors to Curtiss-Wright Corporation, a corporation of Delaware
Filed July 10, 1962, Ser. No. 208,889
1 Claim. (Cl. 64—27)

This invention relates to drive connections in general and more particularly to a direct drive connection which is torsionally resilient and capable of accommodating axial misalignments between driving and driven members due to such as bearing clearances and shaft deflections.

The use of spring drive dampers and torsion shaft dampers in direct drive connections to damp drive and backlash forces is commonly known. Such damping means are normally large energy storing devices and are accordingly difficult to accommodate between closely spaced driving and driven members.

This invention teaches the use of such as these types of dampers for a less demanding purpose and in a particular combination wherein maximum advantage is obtained from the more desirable characteristics of each.

It is an object of this invention to provide a torsionally resilient inner connection for use between closely disposed driving and driven components and which will accommodate reasonable axial misalignments therebetween.

It is an object of this invention to provide a combination spring drive damper and resilient torsion shaft assembly for use within a drive mechanism and which will enable closer disposition of the end members of the drive assembly than has heretofore been attained by like means.

It is an object of this invention to provide a spring drive and torsion shaft assembly enabling engagement between the resilient members deeper within a recess provided in the driving member than heretofore considered practical and accordingly enabling a greater length of the torsion shaft member to be accommodated for more resilience and closer disposition of the end members of the drive assembly.

It is an object of this invention to provide a spring drive assembly having a hub portion of minimum thickness and elongated length to enable safe journal bearing support within a deep recess in a driving shaft member and dependable drive force transmission through the extended end thereof.

It is another object of this invention to provide a direct interconnection for bypassing the torsion drive shaft in a combination spring drive and torsion shaft assembly enabling the use of a small diameter torsional shaft while preventing said shaft from being twisted beyond design limits.

A further object of this invention is to provide an intermediate drive connection within a combination spring drive and torsion shaft assembly enabling a compact arrangement between drive force transmitting members.

Another object of this invention is to provide a drive force transmitting mechanism having a torsion shaft provided in compact arrangement therein and wherein driving and driven portions may be spaced closer together and apart from the drive connection with the torsion shaft without adverse effects.

A still further object of this invention is to disclose a compact damper assembly including a torsion drive shaft extending between spaced members of a drive mechanism and having simple and expedient means for keeping the drive ends thereof adequately lubricated for the smooth transmission of drive forces therethrough.

These and other objects and advantages in the practice of this invention will be more apparent upon a reading of the following description of a preferred embodiment of this invention and with reference to the accompanying drawings.

Figure 2:
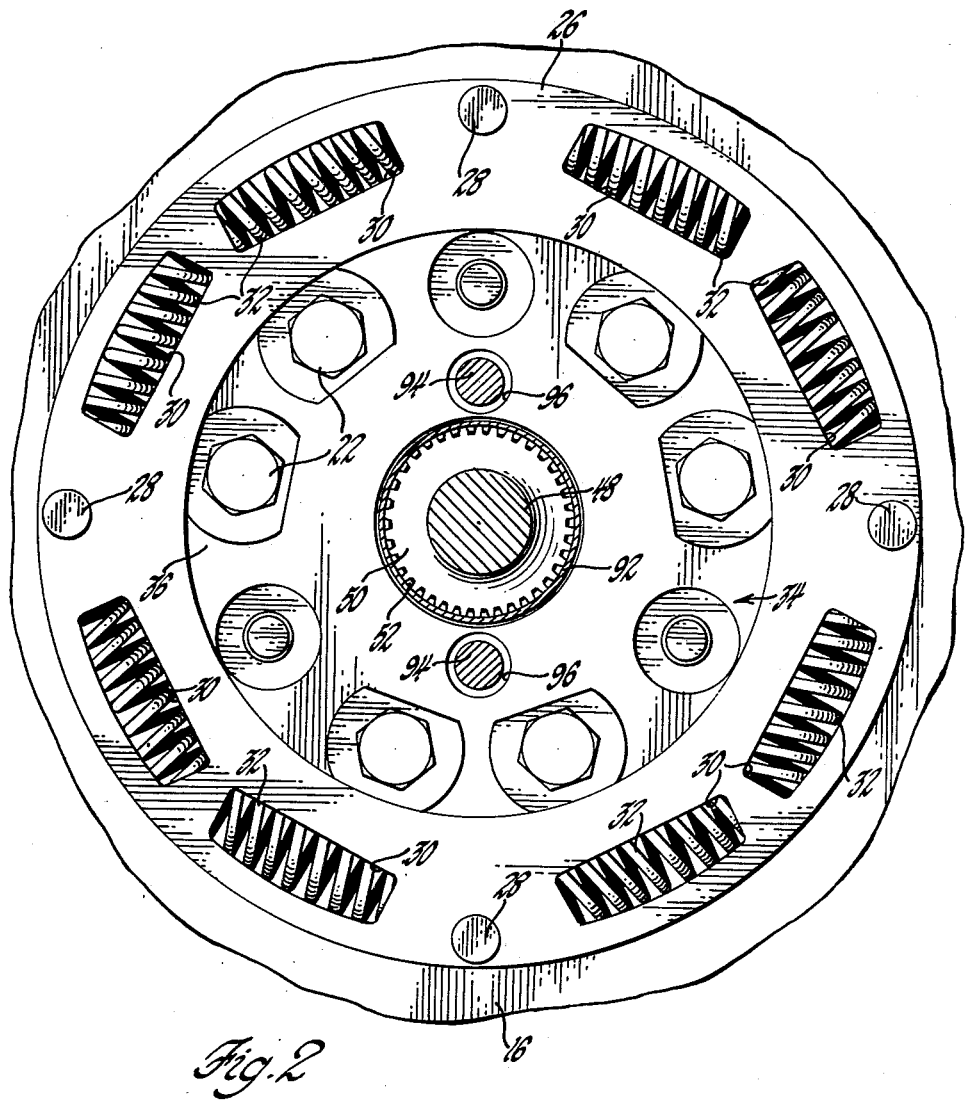

In the drawings:
FIGURE 1 is a longitudinal sectional view of the drive mechanism of this invention as seen with crankcase and drive assembly covers cut away.
FIGURE 2 is an enlarged fragmentary view of the drive mechanism as seen in the plane of line 2—2 in FIGURE 1 and looking in the direction of the arrows thereon.

In the preferred embodiment of this invention, as shown by the drawings, a spring drive assembly is secured to the end of an engine crankshaft and has one end of a torsion shaft member secured to the hub of the driven plate thereof which is recessed deep within the end of the crankshaft. The other end of the torsion shaft member is received within the hub of the driven member which is journalled within the drive assembly cover. Limit stop pins provided on the driven member and received within oversized accesses within the driven plate of the spring drive assembly afford a means of direct drive connection between the spring drive assembly and the driven member to bypass and preclude overloading of the torsional shaft.

Referring to the drawings:
The end of an engine 10 is shown with the crankcase cover 12 broken away and the end of the crankshaft member 14 exposed. The crankshaft member 14 extends slightly beyond the end of the crankcase cover 12 and has a torsional vibration damper 16 secured to the end thereof. A drive assembly housing 18 is secured to the crankcase cover 12 and the drive mechanism of this invention is disposed therein.

The spring drive assembly 20 is secured to the end of the crankshaft 14 by means of bolts 22 which also secure the vibration damper 16 thereto. Such drive assembly 20 is, in part, of conventional design, that is, it includes a pair of drive plates 24 and 26 disposed in parallel spaced relation and secured together near their outer periphery by rivet fasteners 28 at spaced intervals. The drive plates are formed to include pockets 30 within which are disposed coiled compression springs 32.

A driven plate member 34, which is also part of the spring drive assembly 20, includes a flange portion 36 having circumferentially spaced openings 38 which line up with the spring pockets 30 in the drive plates and have end walls disposed for engagement with the compression springs 32. The driven plate member 34 differs from known structures of like design in having an elongated hub portion 40 provided on one side thereof. The hub which is of relatively thin walled construction in comparison with conventional designs and extends on only one side of the driven plate flange 36 is of such length as enables spaced journal bearing support thereof. As shown, the engine crankshaft 14 includes a cylindrical bore 42 which receives the elongated hub portion 40 of the driven plate member 34. The driven plate hub 40 is supported within spaced journal bearings 44 and 46 accommodated within the cylindrical bore 42.

A shaft or spindle member 48 is received within the driven plate hub 40 and is engaged therewith. Such shaft or spindle member 48 includes a splined head 50 engaged with splines provided within the driven plate hub, as at 52. The shaft member 48 is torsionally flexible and extends from within the crankshaft bore beyond the end of the crankshaft member for engagement with a driven member 54 disposed in spaced relation to the end of the crankshaft.

The driven member 54 is, in this instance, a gear toothed member having a hub portion 56 including a cylindrical bore 58 which receives the torsionally flexible shaft 48 therein. Such driven member is journalled for rotation within journal bearing supports 60 and 62 on the journal bearing members 64 and 66 which are pinned to the bearing supports 60 and 62 respectively as shown. The gear head of the driven member 54 has piston ring dampers 68 on the underside thereof. The driven member also has an accessory drive gear 70 secured thereto. Driven member 54 is part of the gear train which includes gear members 72 and 74 on an idler shaft 76, the gear member 74 being adapted to drive such as the impeller of a supercharger (not shown).

The end of torsion shaft 48, which includes a splined head 78, is received within the bore 58 provided within the hub of the driven member. The splined head 78 engages a complementary splined area 80 within the bore 58 near the end thereof disposed within the bearing support 62.

The torsion shaft 48 thus extends between the elongated hub 40 of the spring drive assembly 20 and the outer disposed end of the hub portion 56 of the driven member. As shown, the respective bores provided within the driven plate hub 40 and the driven member hub 56 are axially aligned. Slight misalignments of the axes however, may occur due, for example, to clearances in drive shaft bearings or deflections of the drive shaft, but they do not prevent effective operation of the coupling of the invention. The spring assembly 20, including hub 40, merely tilts at the splined connection between the hub 40 and shaft 48, that is, at 50. The ends of the respective bores are sealed by closure members 82 and 84. The closure member 84 is actually secured to the end of the torsion shaft 48 and is retained in position by a lock ring 86. This serves to locate the torsion shaft 48 at one end thereof.

The ends of the torsion shaft 48 receive lubrication by means of an oil passage 88 provided within the end of the crankshaft 14 and intercepting the bore 42. An oil passage 90 formed through the closure member 82 enables the lubricant to reach one end of the torsion shaft 48. Normally, a separate lubricant passage means would be required for the other end of the torsion shaft. However, in the present instance a sleeve member 92 is provided within the hubs 40 and 56 to span the space therebetween. Accordingly, lubrication of both ends of the torsion shaft 48 is accomplished with the passage means 88 and 90.

The drive assembly thus far described affords a spring drive connection between the end of the crankshaft 14 and the driven member 54 through the spring drive assembly 20 and the torsion shaft or spindle 48. Initial drive forces cause compression of the spring members 32 and the transmission of drive forces through the hub 40 of the driven plate to the torsion shaft 48. Assuming some drive resistance as regards the driven member 54, the torsion shaft 48 will be torsionally wound in transmitting the drive force therethrough to the driven member.

To guard against any failure within the proposed drive assembly, and to make practical the innovations proposed, a direct drive connection is provided between the driven plate 34 of the spring drive assembly 20 and the driven member 54. Such drive connection includes dowel pins press fitted within the end of the hub 56 of the driven member and disposed on diametrically opposite sides thereof. The extended ends of the dowel pins 94 are received within openings 96 formed within the driven plate flange 36 near the junction thereof with the elongated hub portion 40. These holes 96 are sufficiently larger in size than the dowel pins 94 to permit limited movement of the dowel pins before they bottom against side walls of the holes. The direct drive connection performs an important function in that it guards against overloads on sudden drive speed changes and allows a more flexible drive connection without concern for overstressing the torsional element.

Although there does not appear to be much clearance for relative movement of the dowel pin ends within the receptive holes, the closeness of this drive connection to the axis of rotation of the drive force transmitting components is such that substantially full compression of the spring members of the spring drive assembly is experienced when the dowel pins engage the side walls of the receptive holes to render the direct drive connection effective. Such clearance permits twisting of the torsion shaft 48 only within predetermined design limits.

From the foregoing description of the preferred embodiment of this invention, it will be appreciated that a superior drive force transmitting means has been devised.

The end drive members are able to be disposed much closer together with the elimination of the large hub usually required on the driven plate member of the spring drive assembly. This is done without sacrifice of ample journal bearing support for either of the end drive members and in fact in a way which enables better journal support of the driven plate member itself.

The elimination of the large hub on the driven plate member and the use of the elongated hub is made practical by the direct drive interconnection between the driven plate and the hub of the end drive member. This also enables the torsion shaft to be designed with greater flexibility.

As will be further appreciated, the longer hub of the driven plate member enables better journal support thereof and a larger splined area for better drive connection with the torsion shaft member.

Of still further note is the fact that the drive connection between the torsion shaft and the driven plate member is now possible deeper within the bore provided in the end of a crankshaft member and within a better supported area than at the unsupported free end thereof. This advantage is also obtained at the other end of the torsion shaft by having the drive connection made concentrically within one of the assembly cover supports.

It will be appreciated that although only a preferred embodiment of this invention has been shown and described, certain modifications and improvements have been generally suggested. It is to be understood that such modifications, and improvements as fall within the spirit and scope of this invention, though not specifically described, are to be considered as encompassed within the hereinafter appended claim unless expressly excluded by the language thereof.

We claim:

A drive mechanism, comprising: a drive member having a bore provided therein, a spring drive assembly engaged to said drive member and including a driven plate member having an elongated hub on one side thereof with a bore therethrough, spaced journal bearing support means provided in the bore of said drive member and having said elongated hub received therein, a torsionally flexible shaft having one end received within the bore of said elongated hub and engaged with the extended end thereof, a driven member including a hub and having a bore provided therethrough, means engaging opposite ends of the hub of the driven member for rotational support of said driven member, said torsionally flexible shaft having the other end thereof received in said last mentioned bore and engaged with said driven member, limit stop pins provided in the terminal end of the hub of said driven member and axially disposed towards the driven plate of said spring drive assembly, stop pin receptive accesses provided in said driven plate and sized to permit limited relative movement of said stop pins therein, said spring drive assembly and torsionally flexible shaft providing damped drive force transmission between said drive and driven members within the clearance fit limits between said stop pins and receptive accesses, means closing the outer end of the bore in the elongated hub of the driven plate member and the bore in said driven member, lubricant providing means afforded through one of said bore end closing means, and a sleeve member received in spaced concentric relation about said torsionally flexible shaft and having opposite ends received within the elongated hub of the spring driving assembly and the hub of said driven member to provide a closed chamber space for lubrication of both ends of said shaft from only one end thereof.

References Cited in the file of this patent

UNITED STATES PATENTS

| | | |
|---|---|---|
| 1,753,365 | Daukus | Apr. 8, 1930 |
| 2,127,996 | Havill | Aug. 23, 1938 |
| 2,407,114 | Tyler et al. | Sept. 3, 1946 |
| 2,776,556 | Gustafson et al. | Jan. 8, 1957 |

FOREIGN PATENTS

| | | |
|---|---|---|
| 406,637 | Great Britain | Sept. 2, 1933 |